US007005580B1

(12) United States Patent
Craig

(10) Patent No.: US 7,005,580 B1
(45) Date of Patent: Feb. 28, 2006

(54) ELECTRICAL OUTLET COVER

(76) Inventor: Erwin Craig, 7224 LaSalle Ave., Los Angeles, CA (US) 90047

( * ) Notice: Subject to any disclaimer, the term of this patent is extended or adjusted under 35 U.S.C. 154(b) by 25 days.

(21) Appl. No.: 10/919,991

(22) Filed: Aug. 17, 2004

(51) Int. Cl.
*H05K 5/03* (2006.01)

(52) U.S. Cl. ............... 174/67; 174/66; 220/242
(58) Field of Classification Search .......... 174/66, 174/67; 220/241, 242
See application file for complete search history.

(56) References Cited

U.S. PATENT DOCUMENTS

| 4,484,021 A | * | 11/1984 | Schaefer et al. ............. 174/53 |
| 5,011,419 A | | 4/1991 | Maan ..................... 439/145 |
| 5,675,126 A | * | 10/1997 | Halvorsen ................... 174/67 |
| 5,727,958 A | | 3/1998 | Chen ...................... 439/136 |
| 6,342,676 B1 | | 1/2002 | Ha ........................ 174/67 |

* cited by examiner

*Primary Examiner*—Dhiru R. Patel
(74) *Attorney, Agent, or Firm*—Goldstein Law Offices, P.C.

(57) ABSTRACT

A dual electrical outlet cover, which covers a dual electrical outlet having a face for safeguarding against risk of children inserting objects into power receptacles. The outlet cover has a rear surface positionable on top of the face of the dual electrical outlet. Two centrally located rectangular openings extend through the outlet cover. A pair of spring-loaded cover plates fitted into guided tracks move upwardly and downwardly to cover the rectangular openings. A pair of slotted openings along the side edges of the outlet cover have pins extend outwardly therefrom. The spring-loaded cover plates slide open by pressing the spring-loaded retaining pins inwardly to unlatch the spring-loaded cover plates.

8 Claims, 3 Drawing Sheets

ELECTRICAL OUTLET COVER

BACKGROUND OF THE INVENTION

The invention relates to an electrical outlet cover, and more particularly, a dual electrical outlet cover with spring loaded cover plates for safeguarding against the risk of children inserting objects into power receptacles and being injured by an electrical shock.

The standard electrical outlet which provides convenient power receptacles for connecting electrical appliances and devices is a standard fixture in virtually all households in the United States. It would be hard to imagine life without the utilitarian convenience afforded by these devices. These outlets are found in most rooms, if not all, providing electrical connection for lamps, stereos, televisions, kitchen appliances, and many other items. Young children are inquisitive and, not being old enough or experienced enough to recognize the danger of electrical shock, frequently play in the area of power outlets. The greatest danger of children getting electrically shocked is by grasping the exposed contacts of an electric plug which is not firmly abutted against the outlet or by inserting some metal type metallic object into the outlet. These accidents can, and do, happen, resulting in injury to the child, sometimes fatal injury.

U.S. Pat. No. 5,011,419 to Maan discloses a spring biased sliding cover plate for covering and electrical socket in a safe manner. U.S. Pat. No. 5,727,958 to Chen discloses a slidable spring operated telescoping guard lid for covering a household wallplate socket. U.S. Pat. No. 6,342,676 to Ha discloses a safety guard for covering an electrical outlet.

While these units may be suitable for the particular purpose employed, or for general use, they would not be as suitable for the purposes of the present invention as disclosed hereafter.

SUMMARY OF THE INVENTION

It is an object of the invention to produce an electrical outlet cover for safeguarding against the risk of children inserting objects into power receptacles and being injured by electrical shock. Accordingly, the outlet cover of the invention has two rectangular openings for exposing power receptacles and a pair of spring-loaded cover plates fitted into guided tracks that move upwardly and downwardly to cover the rectangular openings and prevent injury to children when the receptacles are not being used.

It is another object of the invention to provide an outlet cover capable of exposing power receptacles when necessary. Accordingly, the outlet cover has side edges and a pair of slotted openings along the side edges with spring-loaded retaining pins extending outwardly therefrom. When the pins are pressed inwardly by an adult, the spring-loaded cover plate is easily unlatched and moves upwardly or downwardly to expose the receptacles.

It is another object of the invention to provide an outlet cover capable of easily securing to an electrical outlet. Accordingly, the invention has at least one circular opening centrally positioned along the outlet cover and extending therethrough, for allowing a screw to be inserted therein for easily securing the outlet cover to the electrical outlet.

The invention is a dual electrical outlet cover, which covers a dual electrical outlet having a face for safeguarding against risk of children inserting objects into power receptacles. The outlet cover has a rear surface positionable on top of the face of the dual electrical outlet. Two centrally located rectangular openings extend through the outlet cover. A pair of spring-loaded cover plates fitted into guided tracks move upwardly and downwardly to cover the rectangular openings. A pair of slotted openings along the side edges of the outlet cover have pins extend outwardly therefrom. The spring-loaded cover plates slide open by pressing the spring-loaded retaining pins inwardly to unlatch the spring-loaded cover plates.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
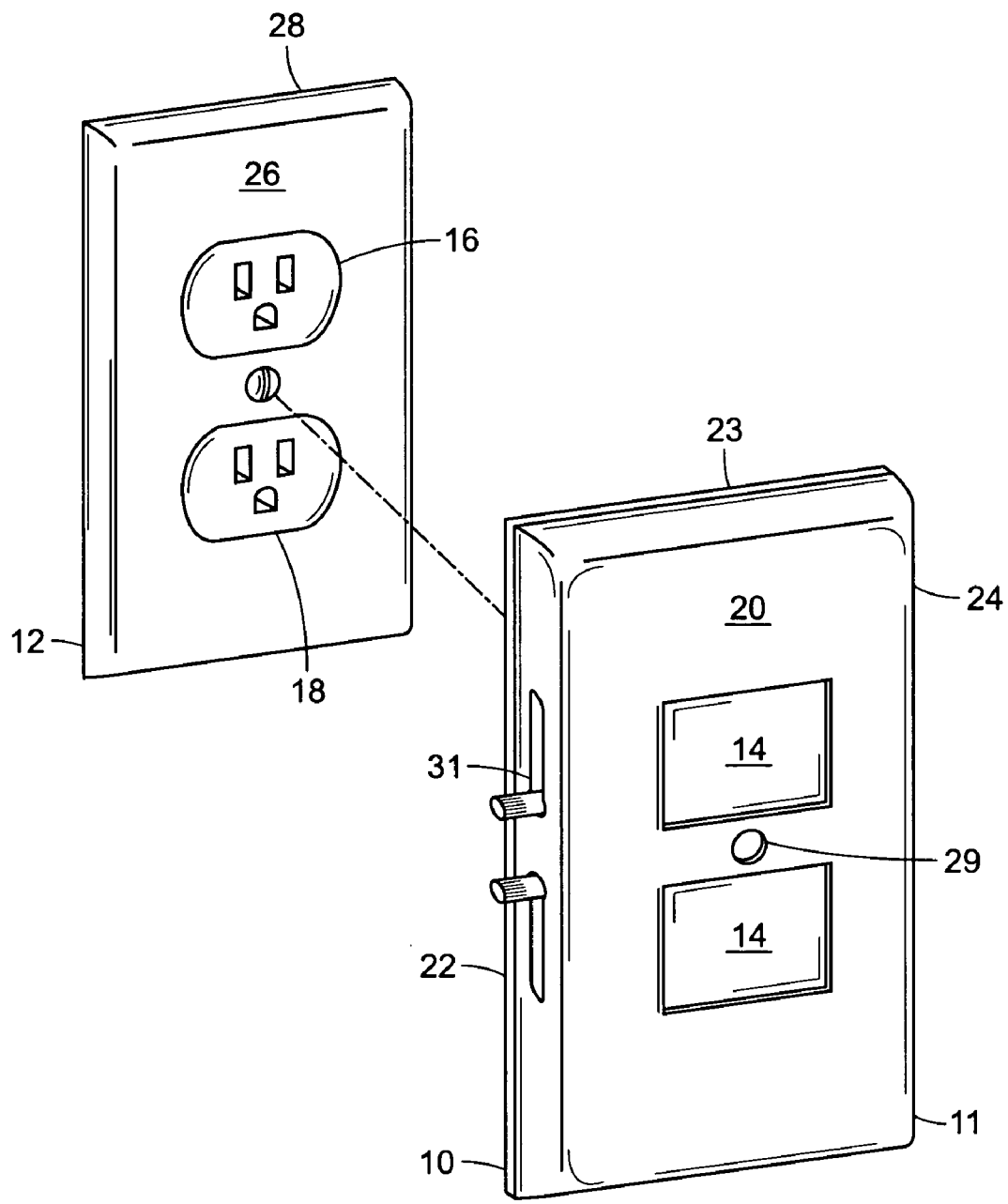
FIG. 1 is a diagrammatic perspective view of the dual electrical outlet cover in use covering a dual electrical outlet, having dual spring-loaded cover plates, for covering an upper and lower receptacle.
Figure 2:
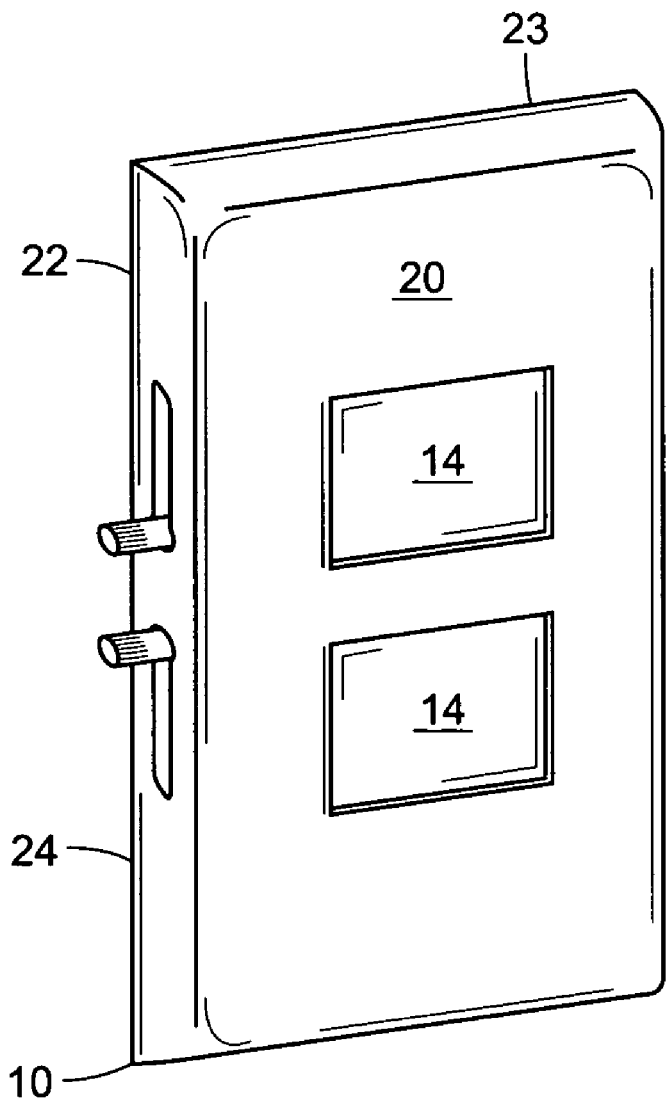
FIG. 2 is a diagrammatic perspective view of the dual electrical outlet cover of the present invention.

FIGS. 1 and 2 illustrate a dual electrical outlet cover 10 with a pair of spring loaded cover plates 14 for safeguarding against risk of children inserting objects into power receptacles and being injured by electrical shock. The dual spring-loaded cover plates 14 each cover either an upper or lower power receptacle 16 and 18 of the electrical outlet 12. The outlet cover 10 is preferably made of durable plastic.

The outlet cover 10 has a front plate 11 which is substantially rectangular in shape and includes a front surface 20, a rear surface 22, two opposite side ends 23 and two opposite side edges 24. The electrical outlet 12 is substantially rectangular in shape and has a face 26 surrounded by a perimeter 28. The rear surface 22 of the outlet cover 10 is positioned on top of the face 26 of the electrical outlet 12. The four side edges 24 of the outlet cover 10 securely fit along the perimeter 28 of the electrical outlet 12. The outlet cover 10 includes at least one circular opening 29, positioned centrally along the front plate 11 of the outlet cover 10, extending therethrough for allowing a screw to be inserted therein for securing the outlet cover 10 to the electrical outlet 12.

The pair of spring-loaded cover plates 14 are centrally positioned, one above the other, on the rear surface 22 of the outlet cover 10. The front plate 11 of the outlet cover 10 has two rectangular openings 32 extending therethrough, which are positioned for use directly on top of the upper and lower receptacles 16 and 18 and are covered by the spring-loaded cover plates 14. Along the opposite side edges 24 of the outlet cover 10 are slotted openings 31.

Figure 3:
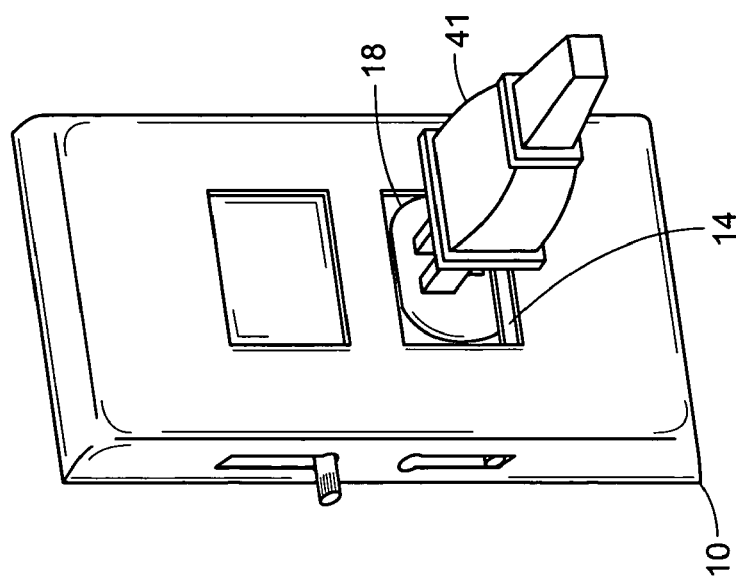
FIG. 3 is a diagrammatic perspective view of the dual electrical outlet cover of the present invention, wherein one of the spring-loaded cover plates is being slid downwardly for receiving an electric plug within the lower receptacle.

FIG. 3 illustrates an outlet cover 10 of the present invention, wherein one of the spring-loaded cover plates 14 is being slid downwardly for receiving an electric plug 41 within the lower receptacle 18.

Figure 4:
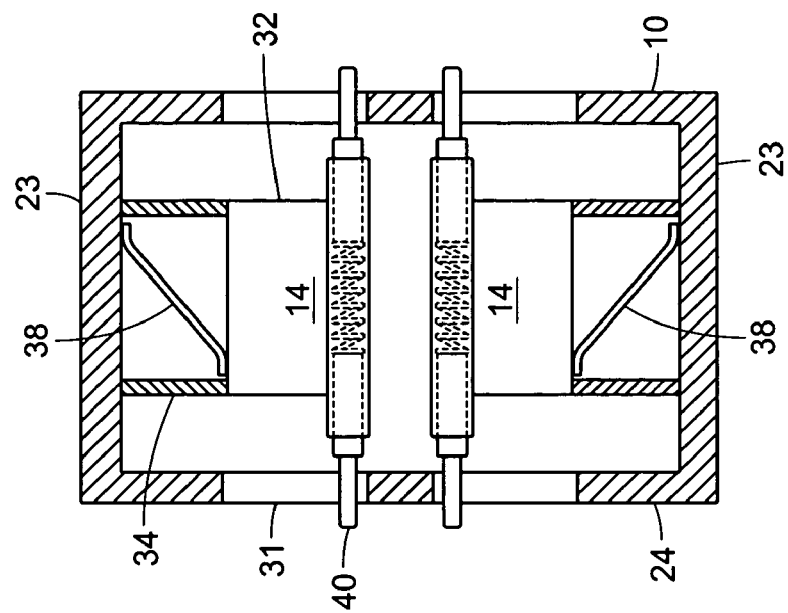
FIG. 4 is a cross-sectional view of the dual electrical outlet cover, wherein the dual spring-loaded mechanisms of the spring-loaded cover plates are shown.

FIG. 4 illustrates the rear surface 22 of the outlet cover 10 showing the spring-loaded cover plates 14 covering the rectangular openings 32 of the outlet cover 10. The spring-loaded cover plates 14 fit into guided tracks 34, having two spring-loaded mechanisms, including two leaf springs 38, two coil springs 39, and four pins 40. Two pins 40 extend outwardly from each of the coil springs 39 through the slotted openings 31. The guided tracks 34 are positioned against the rear surface 22 of the outlet cover 10 near the opposite side edges 24. The pins 40 are fitted into the slotted openings 31, enabling the spring-loaded cover plates 14 to be slid upwardly or downwardly, thereby exposing the upper and lower receptacles 16 and 18 of the electrical outlet 12. To move the spring-loaded cover plate 14 open, the two pins 40, which are attached to one coil spring 39, would be pressed inwardly to unlatch the spring-loaded cover plate 14. The slotted openings 31 from which the pins 40 protrude would allow the spring-loaded cover plate 14 to be closed without being impeded by the pins 40. The leaf springs 38 on the rear surface 22 of the outlet cover 10 are compressed against the opposite side ends 23, upwardly or downwardly, whenever the spring-loaded cover plate 14 is slid upwardly or downwardly.

The springs 38 of the spring-loaded mechanism 36 exerts pressure which causes the spring-loaded cover plate 14 to return to an original position, which is closed covering the upper and lower receptacles 16 and 18, when the pins 40 are released. The spring-loaded cover plate 14 will return to the closed position when an electric plug 41 is not inserted into one of the receptacles 16 or 18. This ensures that the unused receptacles 16 or 18 is not exposed, when no electric plug 41 is inserted.

In conclusion, herein is presented a dual electrical outlet cover with spring loaded cover plate for safeguarding against risk of children inserting objects into power receptacles and being injured by electrical shock. The invention is illustrated by example in the drawing figures, and throughout the written description. It should be understood that numerous variations are possible, while adhering to the inventive concept. Such variations are contemplated as being a part of the present invention.

What is claimed is:

1. A dual electrical outlet cover, which covers a dual electrical outlet having a face and a perimeter, the electrical outlet having an upper and lower power receptacle, for safeguarding against risk of children inserting objects into power receptacles and being injured by electrical shock, comprising:
    a front plate having a front surface, a rear surface, two opposite side ends, and two opposite side edges, the rear surface is positionable on top of the face of the electrical outlet, the side ends and side edges of the outlet cover securely fit along the perimeter of the electrical outlet, two centrally located rectangular openings extend therethrough and are positionably directly on top of the upper and lower receptacles;
    at least one circular opening centrally positioned along the front plate extending therethrough, for allowing a screw to be inserted therein for securing the front plate of the outlet cover to the electrical outlet;
    a pair of spring-loaded cover plates centrally positioned, one above the other, on the rear surface of the outlet cover for covering the rectangular openings, the spring-loaded cover plates fit into guided tracks having two spring-loaded mechanism, the guided tracks are positioned against the rear surface of the outlet cover near the opposite side edges, each spring-loaded mechanism includes a leaf spring, a coil spring, and two pins, and the leaf spring is compressed against the opposite side ends, to slide the spring-loaded cover plate upwardly or downwardly; and
    a pair of slotted openings extend along the opposite side edges of the outlet cover, said two pins extend outwardly from each coil spring through the slotted openings, the pins are attached against the rear surface of the outlet cover and enable the spring-loaded cover plates to slide upwardly or downwardly, thereby selectively exposing the upper and lower receptacles of the electrical outlet.

2. A dual electrical outlet cover, which covers a dual electrical outlet having a face and a perimeter, the electrical outlet having an upper and lower power receptacle, for safeguarding against risk of children inserting objects into power receptacles and being injured by electrical shock, comprising:
    a front plate having a front surface, a rear surface, two opposite side ends, and two opposite side edges, the rear surface is positionable on top of the face of the electrical outlet, the side ends and side edges of the outlet cover securely fit along the perimeter of the electrical outlet, two centrally located rectangular openings extend therethrough and are positionably directly on top of the upper and lower receptacles;
    a pair of spring-loaded cover plates centrally positioned, one above the other, on the rear of the outlet cover for covering the rectangular openings;
    a pair of slotted openings extending along the opposite side edges of the outlet cover; and
    wherein the front plate further has guided tracks are positioned against the rear surface of the outlet cover near the opposite side edges, wherein the spring-loaded cover plates fit into the guided tracks having two spring-loaded mechanism;
    wherein each cover plate has a spring-loaded mechanism that includes a leaf spring, a coil spring, and two pins, the coil spring is selectively compressed against the opposite side ends allow the spring-loaded cover plate to slide upwardly or downwardly.

3. The dual electrical outlet cover of claim 2, further comprising at least one circular opening centrally positioned along the front plate extending therethrough, for allowing a screw to be inserted therein for securing the front plate of the outlet cover to the electrical outlet.

4. The dual electrical outlet cover of claim 3, wherein two pins extend outwardly from each coil spring of the spring-loaded cover plates through the slotted openings.

5. The dual electrical outlet cover of claim 4, wherein the pins are attached against the rear surface of the outlet cover and enable the spring-loaded cover plates to slide upwardly or downwardly, thereby selectively exposing the upper and lower receptacles of the electrical outlet.

6. A method of using a dual electrical outlet cover, for covering a dual electrical outlet having two receptacles, the outlet cover having opposite edges having slotted openings therein, having spring-loaded cover plates having spring-loaded retaining pins and coil springs, the spring-loaded cover plated having an open and closed position, the steps comprising:
    moving the spring-loaded cover plate to its open position by pressing the spring-loaded retaining pins inwardly to unlatch the spring-loaded cover plate.

7. The method of using a dual electrical outlet cover of claim 6, the steps further comprise inserting an electric plug through the spring-loaded cover plates into one of the receptacles which prevents the spring-loaded cover plate from returning to the closed position.

8. The method of using a dual electrical outlet cover of claim 7, the steps further comprising removing the electrical plug from the receptacle and allowing the springs of the spring-loaded mechanism to exert pressure which causes the spring-loaded cover plate to return to the closed position.

* * * * *